Sept. 5, 1950 G. W. SCHATZMAN 2,520,965
FENDER AND FENDER SHIELD ASSEMBLY AND
ATTACHING MEANS THEREFOR
Filed Dec. 23, 1946 4 Sheets-Sheet 1
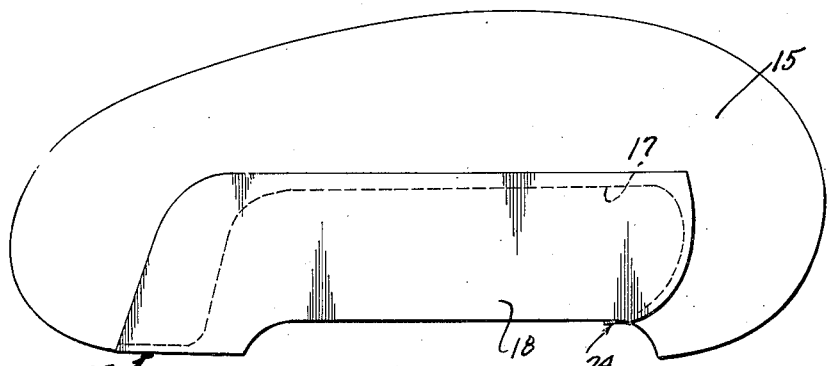
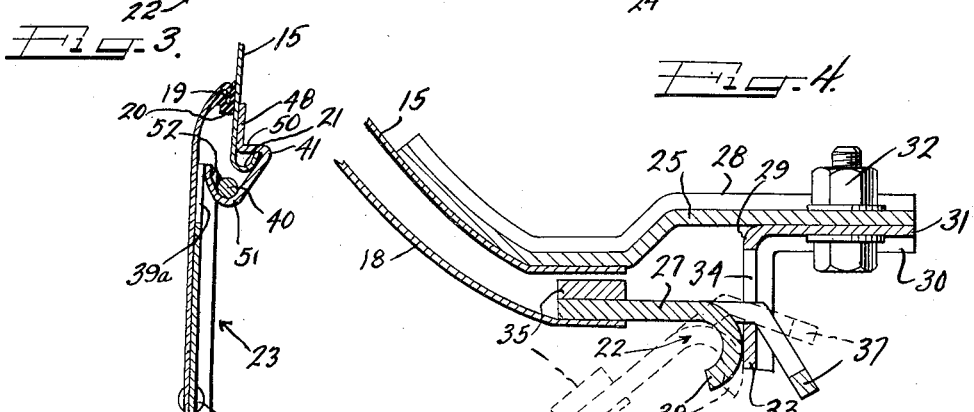
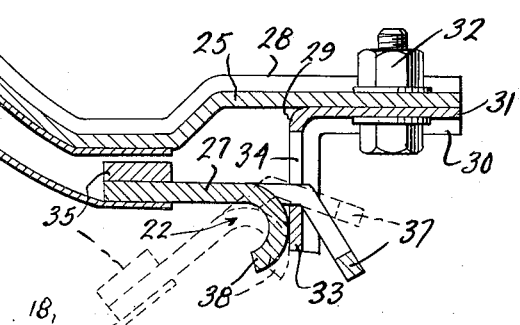
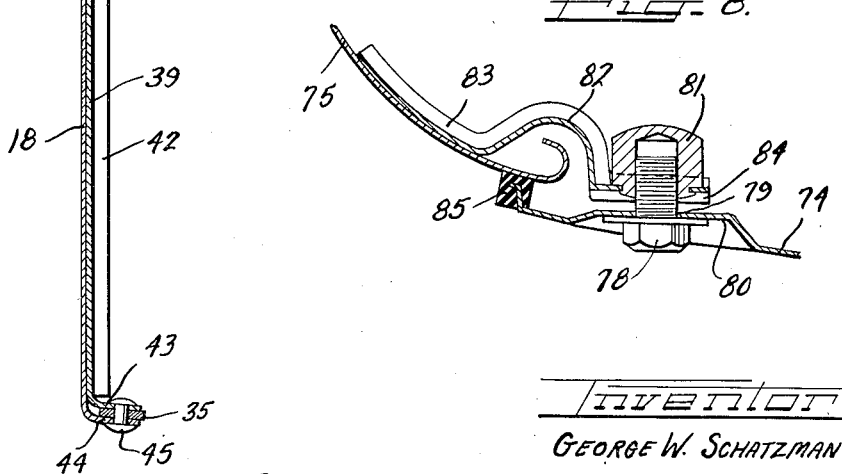
Inventor
GEORGE W. SCHATZMAN

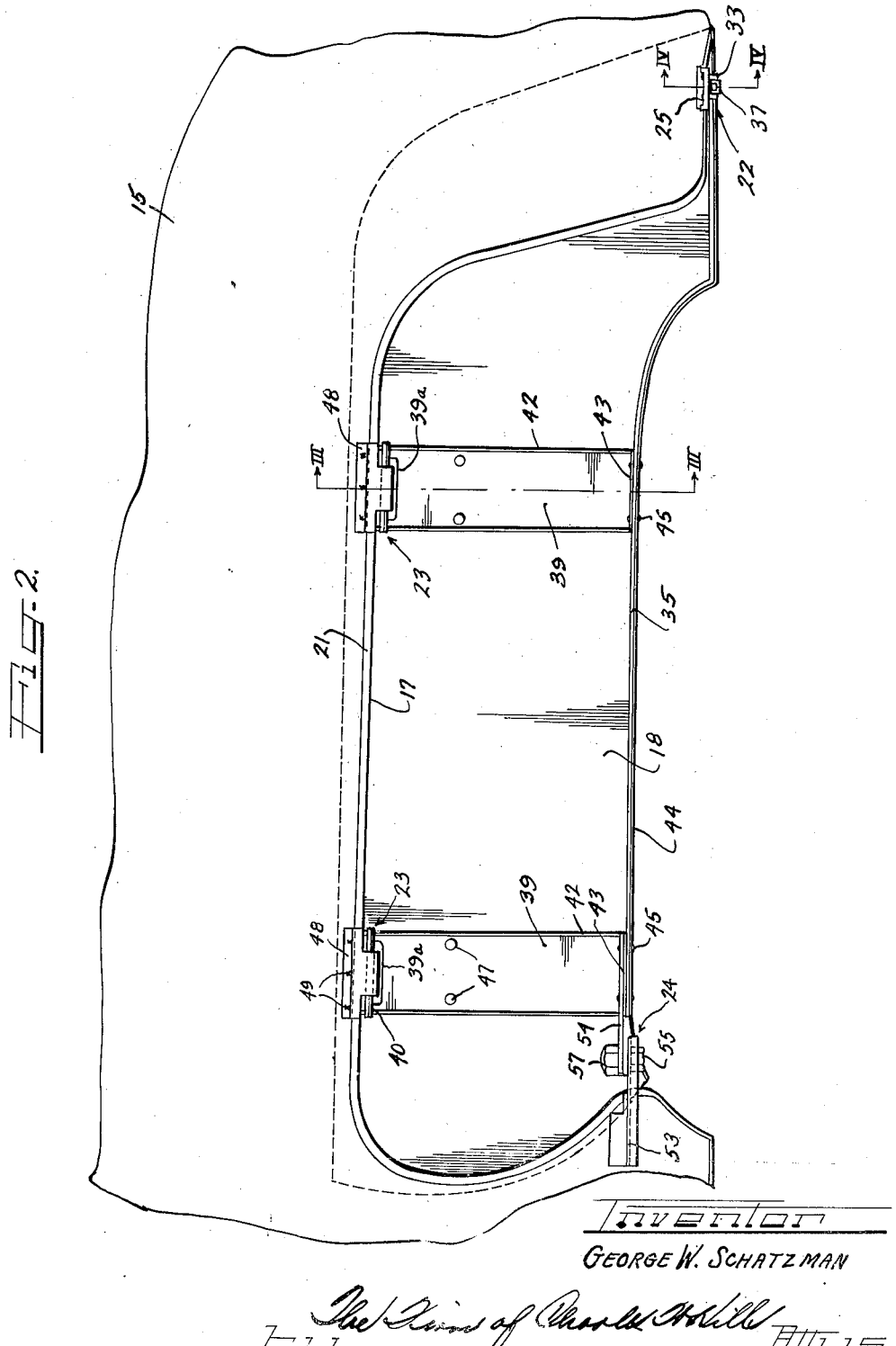

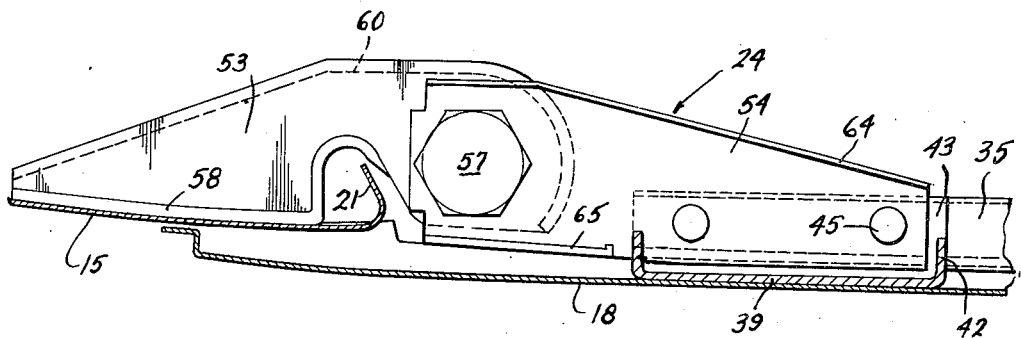
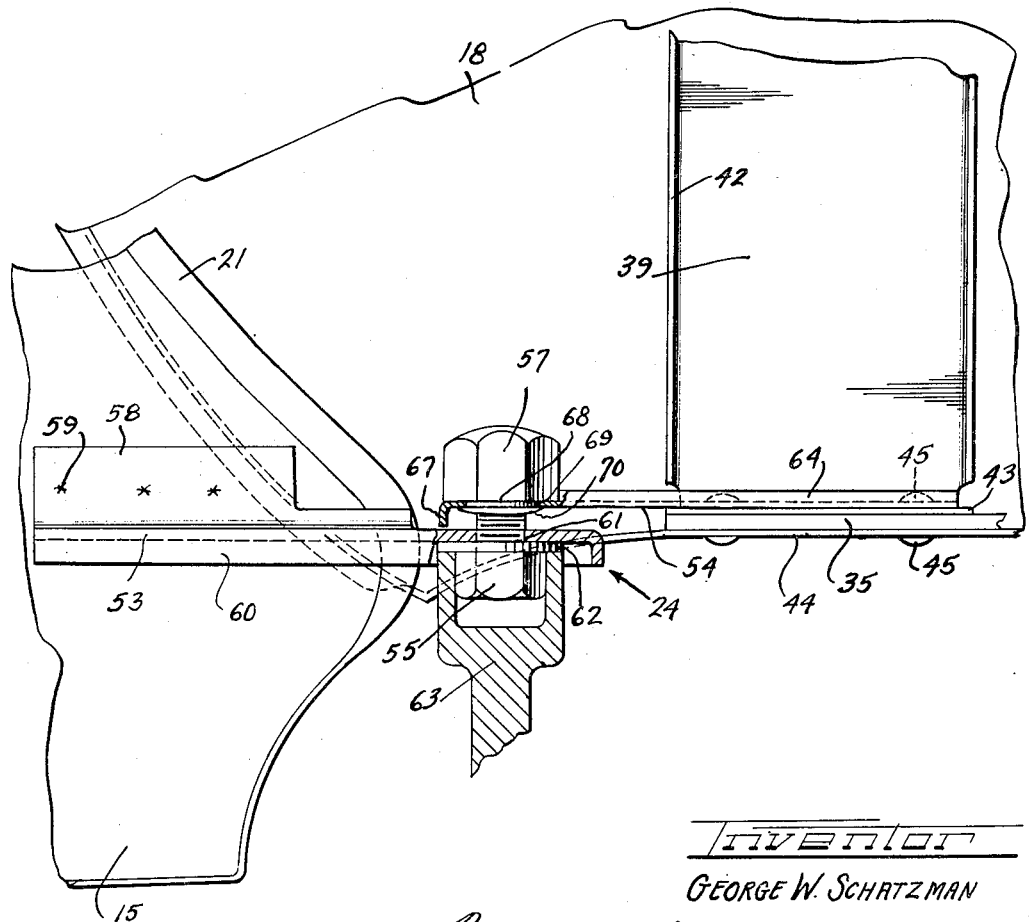

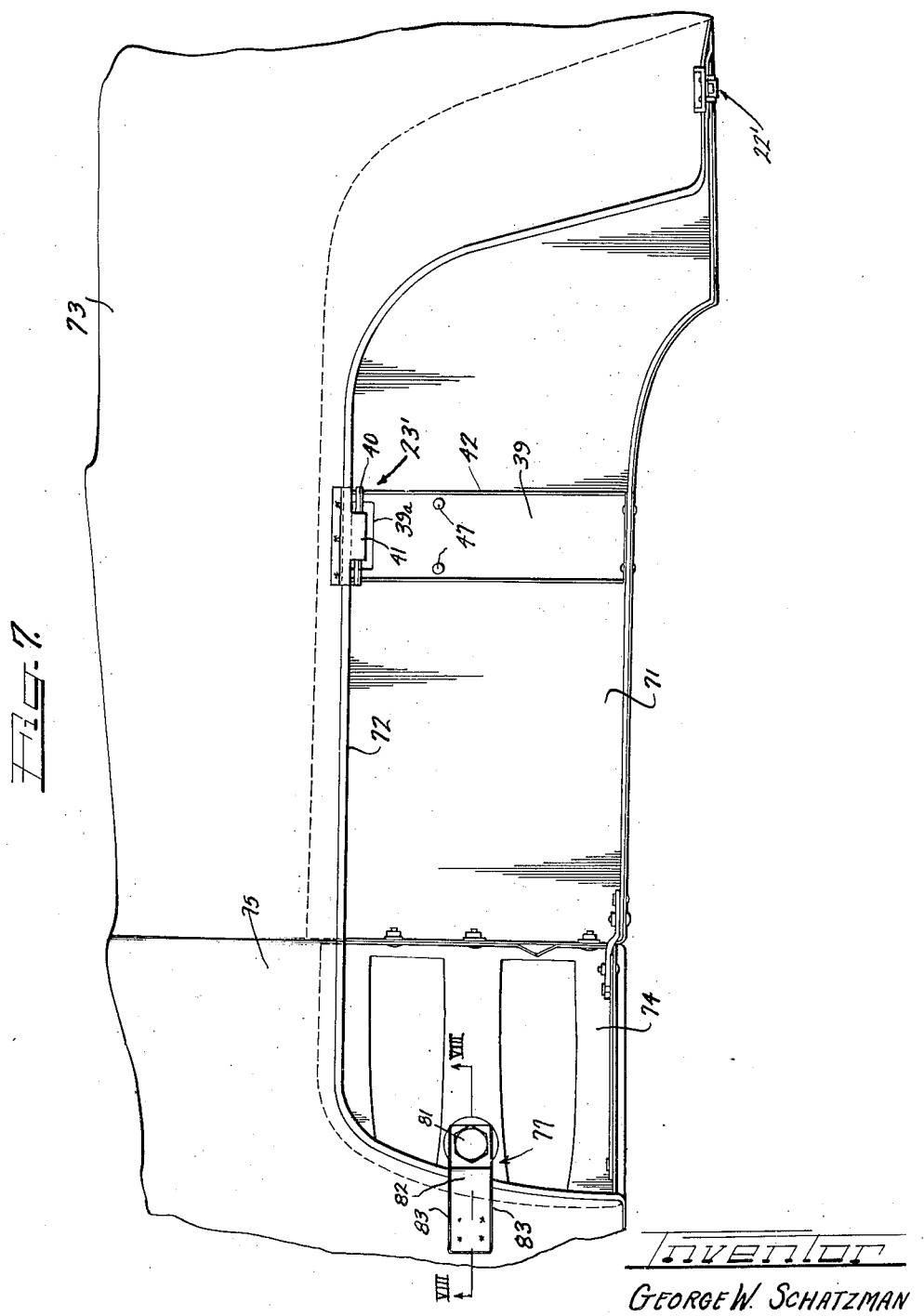

Patented Sept. 5, 1950

2,520,965

UNITED STATES PATENT OFFICE 2,520,965

FENDER AND FENDER SHIELD ASSEMBLY AND ATTACHING MEANS THEREFOR

George W. Schatzman, Detroit, Mich., assignor to Houdaille-Hershey Corporation, Detroit, Mich., a corporation of Michigan Application December 23, 1946, Serial No. 717,972

5 Claims. (Cl. 280—153)

This invention relates to fender and fender skirt or shield assemblies, and more particularly to an improved assembly of this character including novel means for attaching a fender and fender shield together.

In the vehicle industry, and particularly in the automobile industry, various means have been utilized to improve the appearance of vehicle fenders. The usual vehicle fender is provided with an opening which affords access to the vehicle wheel, and which permits the ready removal or replacement of the wheel in an axial direction. Since this opening inherently presents an unattractive outward appearance, detachable fender shields have been employed to cover the opening ornamentally.

As the term "fender shield" shall hereinafter be employed, it refers to any member which is adapted to be secured to a fender or other portion of a vehicle body for the purpose of covering the opening in the fender or vehicle body which is provided for access to or removal of a vehicle wheel. Furthermore, as the term "fender" shall hereinafter be employed, it refers to any form of wheel fender in its broad sense, whether such fender be separated from the vehicle body part, partly separated from the vehicle body part, or actually an integral part of the vehicle body, and whether or not it projects outwardly away from the principal body portion of the vehicle.

An important object of the present invention is to provide a novel fender and fender shield assembly in which the fender shield is secured to the fender in a novel manner.

Another object of the invention is to provide a novel fender shield construction which is economical to manufacture, which is rugged and reliable in use, and in which the fender shield may be readily and quickly attached to and detached from the vehicle fender.

A further object of the invention is to provide a fender shield having improved means for attaching the same to a fender.

Still another object of the invention is to provide a novel structure for detachably securing a fender shield to a fender.

A still further object of the invention is to provide an improved assembly for maintaining a fender shield in closely abutting tensioned relationship to a fender and in which such close relationship is attained automatically as an incident to mounting and securing the fender shield in place.

Yet another object of the invention is to provide improved means for quickly and easily attaching or detaching a fender shield and which will positively hold the fender shield against unintentional detachment.

It is also an object of the invention to provide novel means for attaching a fender shield in service relation to a fender and which means is operative in response to the movement of the fender shield in its plane to draw the fender shield in a direction normal to its plane into tight engagement with the fender upon which it is mounted.

Other objects, features and advantages of the invention will be readily apparent from the following detailed description of certain preferred embodiments thereof taken in conjunction with the accompanying four sheets of drawings in which:

Figure 1 is a side elevational view of a fender and fender shield assembly embodying the features of my invention;

Figure 2 is an enlarged inside elevational view of the fender shield and contiguous portions of the fender;

Figure 3 is an enlarged vertical sectional view taken substantially along the line III—III of Figure 2;

Figure 4 is an enlarged vertical sectional view taken substantially along the line IV—IV of Figure 2;

Figure 5 is a substantially enlarged fragmentary elevational view of the attaching means at the front end of the fender shield, with parts broken away and in section to reveal certain details of the structure;

Figure 6 is a sectional plan view of similar structure as shown in Figure 5 but as it appears in a fender and fender shield assembly for the opposite side of the vehicle;

Figure 7 is a fragmentary inside elevational view of a modified form of fender shield and fender assembly; and Figure 8 is an enlarged horizontal sectional detail view taken substantially along the line VIII—VIII of Figure 7.

As shown in Figures 1 and 2, a fender 15 having a wheel access opening 17 is adapted to have assembled therewith in closing relation to the wheel access opening a fender shield 18. In this particular form, the fender shield 18 is of the type which overlaps the outer face of the margin of the fender about the wheel access opening 17 and has an inturned marginal reenforcing flange 19 (Figure 3) about its end and upper margin which is adapted to carry a cushioning gasket 20. The margin of the fender defining the wheel access opening 17 preferably has an inturned reenforcing flange 21 thereabout.

According to the present invention, the fender shield 18 is removably attached to the fender 15 by improved means acting more or less automatically coincident with assembly operations to draw the fender shield into snug engagement with the fender. Such means comprise several cooperative structures including, in substantially the order in which they become operative during assembly of the fender shield with the fender, a rear end connecting structure 22, preferably a plurality, herein two, upper marginal connecting structures 23 and a front end connecting structure 24.

The rear end connecting structure 22 (Figure 4) comprises a hanger bracket 25 carried by the underturned portion of the fender 15, and an interengaging member 27 carried by the fender shield 18. The hanger bracket 25 is preferably in the form of an elongated sheet metal plate or bar having side reenforcing flanges 28 and is secured to the inside face of the underturned margin of the fender 15 by welding or the like. The bracket member 25 extends beyond the lower edge of the fender to provide a substantially cantilever support for a hanger angle 29 which may be a substantially L-shaped angle bar having reenforcing side flanges 30. A base flange 31 of the hanger angle is secured as by means of bolts 32 to the inward extension of the hanger bar 25 while a downwardly extending flange 33 is formed with an aperture 34 for receiving the engagement member 27. Thus, the lower portion of the flange 33 below the aperture 34 provides, in effect, a hanger bar.

The engagement member 27 may be in the form of an elongated tongue or finger of metal secured to the margin of the fender shield 18 under a reenforcing bar 35 and extending beyond the edge of the fender shield to project through the hanger aperture 34. The extremity portion of the engagement member 27 is preferably formed as a downwardly oblique interlock flange or hook 37 which is adapted to be projected through the aperture 34 by moving the fender shield 18 toward the hanger flange 33 while tilted at a substantial angle away from the fender substantially as shown in broken outline in Figure 4. Thereupon, the fender shield 18 can be tilted up toward the fender and the flange 37 will act as a cam sliding downwardly along the hanger bar provided by the flange 33, thereby drawing the fender shield 18 toward the fender until the body of the engagement member 27 engages the hanger bar. By preference a limit upon the inward movement of the engagement member 27 is effected by a downwardly extending stop 38 which may be in the form of a tongue stuck out from the flange 37 and the adjacent portion of the body of the member 27, substantially as shown, and curled upon itself to afford ample clearance between the flange 37 and the stop to receive the hanger bar.

Upon completion of this preliminary assembly operation and with the fender shield 18 now secured at its rear end by the structure 22 attachment thereof through the medium of the upper marginal structures 23 is adapted to be effected. For this purpose each of the structures 23 comprises a vertical strut 39 carrying at its upper end an attachment or hanger bar 40 cooperable with a hanger member 41 carried by the fender 15.

Each of the struts 39 is preferably of a form to afford vertical reenforcement for the panel comprising the fender shield 18. For this purpose, the strut 39 is adapted to be made from suitable sheet metal reenforced and stiffened by longitudinal inwardly extending flanges 42 at its opposite sides. At its lower end, the strut 39 is formed with an inwardly extending foot flange 43 which rests upon the reenforcing bar 35 and is secured to the reenforcing bar and a supporting lower edge reenforcing flange 44 on the fender shield as by means of rivets 45. The length of the strut 39 is preferably such as to extend up to substantially the level of the fender reenforcing flange 21 when the fender shield is assembled with the fender, and the upper portion of the strut is preferably secured flat against the inner surface of the fender shield in any suitable manner, such as by means of rivets 47.

The hanger bar 40 may be simply a length of suitable gauge rod secured in spaced relation to the upper end of the body of the strut 39 as by welding it to the upper end portion of the reenforcing flanges 42.

The hanger member 41 may also conveniently be formed from suitable gauge sheet metal shaped to provide a flange 48 secured as by means of spot welding 49 to the inner surface of the fender shield 15 immediately adjacent to the reenforcing flange 21 and with an inward shoulder flange portion 50 of the hanger member resting upon the flange 21. From the shoulder portion 50 the hanger member extends downwardly and outwardly and is turned up to provide a hook 51 designed to engage the hanger bar 40 and thereby affording a suspension for the fender shield 18.

The outer portion of the hook 51 is preferably formed with an inward slope as shown at 52 and the root portion of the hook is so disposed that upon camming of the hanger bar 40 down the cam portion 52 of the hook into the root of the hook the fender shield 18 is drawn inwardly, preferably under at least slight tension toward and into engagement with the fender 15 whereby to effect a tight, rattle-free assembly. To assure clearance for the outer cam portion of the hook 51, the upper margin of the body of the strut 39 may be cut out as indicated at 39a.

As best seen in Figure 2, there are preferably a pair of the attachment structures 23, one disposed adjacent to each end of the access opening 17, especially where the fender shield 18 is of substantial length, whereby the fender shield is drawn under substantially uniform tension into the assembled relationship with the fender 15 by the inter-action of the two hanger bars 40 within the respective hanger hooks 51, in the manner aforesaid.

In mounting the fender shield 18, after the primary assembly has been effected with the rear attachment structure 22, the fender shield is swung up toward the fender 15 and is also pivoted about a horizontal axis as permitted by the rocking of the attachment finger 27 within the clearance afforded by the hanger flange aperture 34, to bring the hanger bars 40 up into position above the hanger hooks 51. Thereupon, the fender shield 15 is pushed up against the fender 15 and allowed to drop down substantially in its plane, the hanger bars 40 engaging the outer cam portions 52 of the respective hanger hooks 51 and automatically placing the fender shield 18 under assembly tension as the weight of the fender shield, or if necessary a downward pull on the fender shield carries the hanger bars 40 toward or into the bottoms or roots of the respective hanger hooks 51.

As an incident to the final downward assembly movement of the fender shield 18, the components of the front attachment structure 24 are brought into registry for securing the fender shield against unintentional displacement from its assembled relationship with the fender 15. To this end, having reference to Figures 2, 5 and 6, the attachment structure 24 comprises overlapping bracket members 53 and 54 carried by the fender 15 and the fender shield 18, respectively. Connecting means such as a stud bolt 55 threaded into a nut 57 carried on the bracket 54 connects the brackets 53 and 54 together.

The fender-carried bracket 53 is adapted to be formed as a sheet metal stamping having a substantially flat body portion extending horizontally inwardly from the inside of the fender 15 and laterally from the margin of the fender defining the axis opening 17, a vertical reinforcing flange 58 being secured as by means of spot welding 59 to the inner face of the fender. At its inner edge, the bracket 53 is preferably formed with a down-turned reinforcing flange 60. Adjacent its free end, the bracket 53 is formed with an aperture 61 for passage of the threaded shank of the stud bolt 55, the head of the stud bolt bearing up against a washer 62, or which may be formed as an integral collar of the inner end of the stud bolt head, for convenience in applying a wrench 63 for manipulating the stud bolt.

The fender shield-carried bracket 54 may also be formed from sheet metal and have the body thereof extending horizontally inwardly from the fender shield 18 in such a manner as to overlap the apertured free end portion of the fender-carried bracket 53. To this end, the bracket 54 is elongated in form and has the portions thereof adjacent to the nearest strut 39 secured upon the foot flange 43 of such strut as by means of the rivets 45. An inner edge reinforcing flange 64, and outer edge reinforcing flange 65, and a free end reinforcing flange 67 impart adequate stiffness to the bracket 54 for the required purpose.

By preference the nut 57 is permanently secured to the overlapping free end portion of the bracket 54 and for this purpose is formed with an axial projection or neck 68 extending through an aperture 69 in the bracket and upset or peened over in the fashion of a rivet head as shown at 70 for permanently securing the nut in place.

In the final assembly of the fender shield, the nut 57 assumes a position coaxial with the stud aperture 61 so that the stud 55 upon being threaded into the nut 57 by means of the wrench 63 draws the brackets 53 and 54 together and thereby holds the fender shield 18 against movement upwardly in its plane or normal to its plane away from the fender. The relative disposition of the bracket members 53 and 54 and the stud 55 being such, of course, that the lower front end portion of the fender shield 18 is held in snug engagement with the adjacent portion of the fender 15, and preferably under slight tension.

It will thus be apparent that the fender shield 18 is held tightly and preferably under a slight tension against the fender 15 at both ends and at a plurality of points at its upper margin. At each point, moreover, a positive connection or suspension is provided for the fender shield. Thereby, the fender shield 18 is held quite securely against movement relative to the fender 15 and is securely connected against unintentional dislodgment and in particular against dislodgment which might be caused by accidental means. At all times, the fender shield is held tightly against rattling.

In the modified form of fender shield shown in Figure 7, and identified at 71, for closing a wheel access opening 72 in a fender 73 of slightly different structure, the front end portion of the fender shield is constructed of a separate relatively adjustable panel 74 adapted to accommodate a relatively inwardly offset front portion 75 of the fender. In this form of fender and fender shield assembly, rear connecting structure 22′ and intermediate connecting structure 23′, in all essential respects identical with the connecting structures 22 and 23, respectively, of the previously described form of the invention and operative in identical manner, support the rear and intermediate portions of the fender shield 71 in assembly with the fender 73 and maintain a snug tensioned suspension of the fender shield.

However, at the front end of the fender shield, a slightly modified form of attachment structure 77 is employed. In this form of attachment structure, a stud bolt 78 (Figure 8) extends through an aperture 79 within a depression 80 formed in the front panel 74 of the fender shield at approximately its vertical center adjacent to the forward margin and engaged concentrically within a nut 81 supported by a bracket 82 secured to the inner surface of the fender portion 75. The bracket 82 is preferably formed as a sheet metal stamping and has reinforcing flanges 83 and 84, provided at its edges for rigidity. It will be observed, that the stud 78 draws the fender shield portion 74 under tension against the fender portion 75 and at the same time holds the fender shield panel against displacement in its plane, thus cooperating with the attachment structures 22′ and 23′ in maintaining the fender shield 71 in fixed assembly with the fender 73. A gasket 85 is preferably provided between the edge of the fender shield panel 74 and the fender portion 75.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in a fender and fender shield assembly wherein the fender has a wheel access opening and the fender shield closes said opening, means for effecting primary attachment of the fender shield at one end to said fender, means for thereafter effecting assembly of an intermediate portion of the fender shield to the fender, and means for effecting final assembly of the fender shield adjacent its opposite end to the fender comprising a bracket carried by the fender shield and supporting a nut and a bracket on the fender cooperatively related to the fender shield carried bracket and having a stud extending therethrough and secured in said nut.

2. In combination in a fender and fender shield assembly wherein the fender has a wheel access opening and the fender shield closes said opening, means for effecting primary attachment of the fender shield at one end of said fender, means for thereafter effecting assembly of an intermediate portion of the fender shield to the fender, and means for effecting final assembly of the fender shield adjacent its opposite end to the fender comprising a bracket carried by the fender and supporting a nut and a stud securing the fender shield to said bracket and drawing the fender shield into engagement with the fender, said bracket being secured to the fender in a manner to extend into overlapping relation to the fender shield, and the stud extending through the overlapped portion of the fender shield.

3. In combination in attaching structure for a fender and fender shield assembly, a bracket adapted to be carried by the fender and having a hanger portion including a horizontal hanger bar, and a member adapted to be carried by the fender shield and having a flange portion cooperatively engageable with said hanger bar and a depending stop portion also engageable with the bar for limiting movement of the member in one direction relative to said hanger portion, said hanger-engageable flange portion of said member in assembly limiting movement of the member in the opposite direction.

4. In combination in an attaching structure for a fender and fender shield assembly, a hanger bar adapted to be carried by the fender, and a hook member adapted to be carried by the fender shield and adapted to engage the hanger bar upon movement of the fender shield normal to its plane, said hook member being formed from sheet metal and having a stop tongue struck integrally therefrom for limiting relative assembly movement of hook and hanger bar.

5. In combination in means for interconnecting a fender and fender shield, a bracket member including a depending portion having a generally horizontal cross bar, and a finger member having a downwardly oblique terminal flange affording a cam surface engageable upon said cross bar and a downwardly extending stop portion spaced from said terminal flange and adapted to engage against the opposite side of said cross bar from said flange.

GEORGE W. SCHATZMAN.

REFERENCES CITED

The following references are of record in the file of this patent:

UNITED STATES PATENTS

| Number | Name | Date |
|---|---|---|
| 1,605,458 | Neeb | Nov. 2, 1926 |
| 1,631,508 | Wagner | June 7, 1927 |
| 2,048,862 | Haltenberger | July 28, 1936 |
| 2,068,732 | Cadwallader | Jan. 26, 1937 |
| 2,118,256 | Lyon | May 24, 1938 |
| 2,161,160 | Harroun et al. | June 6, 1939 |
| 2,239,373 | Schatzman et al. | Apr. 22, 1941 |
| 2,352,374 | Ferguson et al. | June 27, 1944 |